United States Patent [19]

Christensen

[11] 4,012,056
[45] Mar. 15, 1977

[54] VISUAL GUIDE DEVICE FOR HITCHING VEHICLES

[76] Inventor: Justin D. Christensen, 6808 W. 69th St., Overland Park, Kans. 66204

[22] Filed: Dec. 29, 1975

[21] Appl. No.: 644,533

[52] U.S. Cl. .............................................. 280/477
[51] Int. Cl.² ......................................... B60D 1/06
[58] Field of Search .............. 289/477, 414 R, 507; 33/264; 116/28

[56] References Cited

UNITED STATES PATENTS

| | | | |
|---|---|---|---|
| 2,517,176 | 8/1950 | Brock | 280/507 |
| 2,997,310 | 8/1961 | Poulsen | 280/414 R X |
| 3,015,162 | 1/1962 | Bohnet | 33/264 |
| 3,492,023 | 1/1970 | Thompson | 280/507 |
| 3,765,703 | 10/1973 | Voelkerding | 280/477 |
| 3,818,599 | 6/1974 | Tague | 280/477 |

Primary Examiner—Joseph F. Peters, Jr.
Assistant Examiner—R. Schrecengost
Attorney, Agent, or Firm—Lowe, Kokjer, Kircher, Wharton & Bowman

[57] ABSTRACT

A guide device assists the driver of a towing vehicle in properly positioning the hitch ball located on same for connection with the hitch socket of a trailer. A cover is closely fit over the hitch ball to mount a telescoping sight arm thereto. A compressible ball is tightly inserted in the socket to mount a second telescoping sight arm to the trailer hitch. The sight arms provide guides which enable the driver to accurately back a towing vehicle toward the trailer for connection of the cooperating hitch portions.

6 Claims, 3 Drawing Figures

VISUAL GUIDE DEVICE FOR HITCHING VEHICLES

BACKGROUND AND SUMMARY OF THE INVENTION

This invention relates generally to a guide device which facilitates the hitching together of two vehicles and more specifically to the providing of assistance in properly backing up a towing vehicle to a trailer which is to be hitched thereto.

Considerable difficulty is involved in attempting to back a towing vehicle in order to position its hitch ball properly relative to the hitch socket of a trailer. The major reason for this difficulty is that the driver is unable to see the hitches and must therefore guess whether the vehicle is centered on the trailer. This usually involves a second person giving hand signals or a trail and error procedure during which substantial time is consumed. In any event, hitching the trailer without help from another person is a particularly difficult and time consuming procedure, particularly when the towing vehicle is a truck or other large vehicle from which the vision of the driver to the rear is severely obstructed.

It is an object of the present invention to provide a guide device which assists in quickly and easily positioning the hitch of a towing vehicle with respect to the hitch of a trailer.

Another object of the invention is to provide, in a guide device of the character described, elongate sight arms which may be mounted on the respective hitches and which are readily visible to the vehicle driver.

Yet another object of the invention is to provide a guide device of the character described wherein the sight arms are quickly and easily attachable to and detachable from the hitches.

A further object of the invention is to provide a device of the character described in which the sight arms are uniquely and firmly held in place on the hitches during use. The attaching and holding of the arms is facilitated by the use of a cover which tightly fits over the hitch ball of the vehicle to mount one sight arm, and a compressible ball which likewise tightly fits in the socket of the trailer hitch to mount the other sight arm.

An additional object of the invention is to provide a combination guide device of the character described having sight arms that are extensible and retractable for adjustment of their length.

A still further object of the invention is to provide a guide device of the character described that is constructed inexpensively and easy to use.

Other and further objects of the invention, together with the features of novelty appurtenant thereto, will appear in the course of the following description.

DETAILED DESCRIPTION OF THE INVENTION

In the accompanying drawing which forms a part of the specification and is to be read in conjunction therewith, and in which like reference numerals are employed to indicate like parts in the various views.

Figure 1:
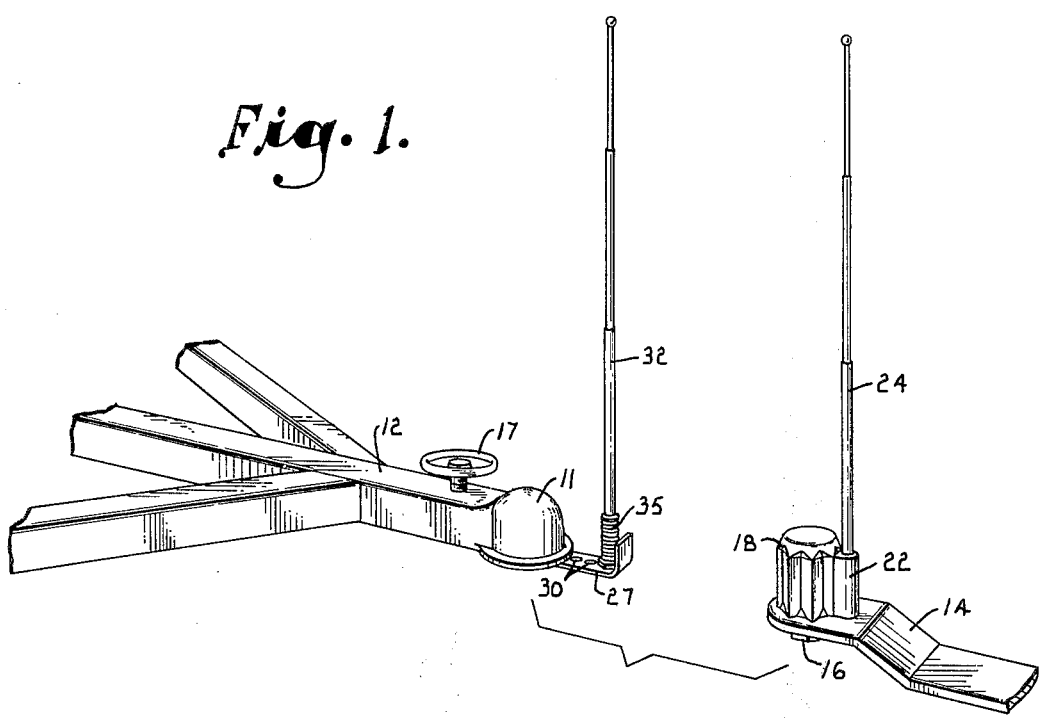
FIG. 1 is a perspective view illustrating the components of a guide device constructed according to the invention and installed on the hitches of a towing vehicle and a trailer.

Referring now more particularly to the drawing, a conventional hitch connection for coupling a trailer to a towing vehicle includes a solid spherical ball 10 on the towing vehicle (not shown) and a generally spherical housing 11 on the trailer (also not shown). Housing 11 forms the end portion of a conventional trailer hitch 12 having a generally spherical socket 13 therein (FIG. 2) which receives ball 10 to couple the vehicles. The towing vehicle includes a conventional hitch portion 14 on which ball 10 is mounted. The ball (10) is supported on a base 15 by bolting same onto hitch 14 as indicated by the bolt-nut combination 16. A manual hand wheel 17 operates in a well known manner to secure ball 10 in socket 13 when the vehicles are hitched together.

Figure 2:
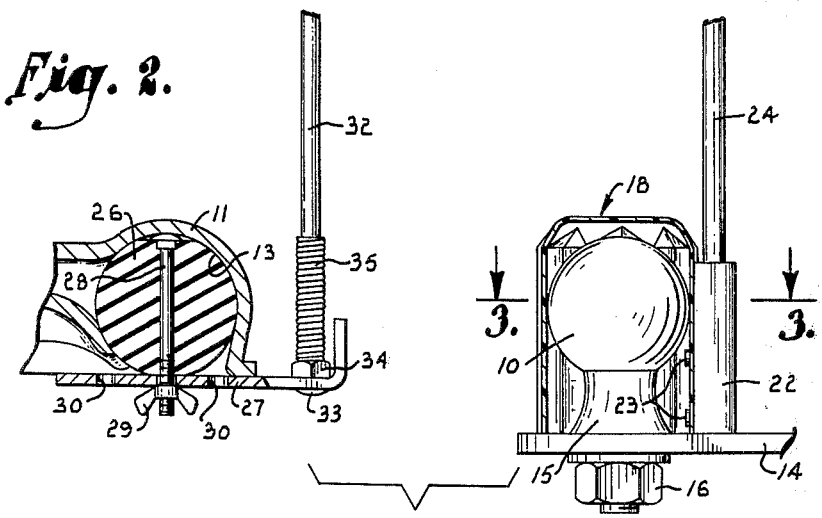
FIG. 2 is an enlarged sectional view illustrating the components of the guide device installed on the hitches of the towing vehicle and trailer.
Figure 3:
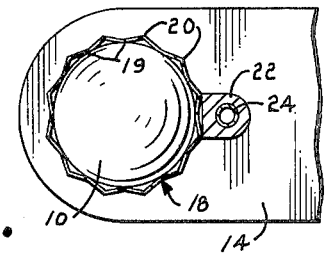
FIG. 3 is a sectional view taken generally along line 3—3 of FIG. 2 in the direction of the arrows.

The present invention provides a visual guide device which is used to guide the vehicle driver during backing of the vehicle to properly position ball 10 relative to housing 11 in order to couple the trailer to the vehicle. In the preferred embodiment, the guide device includes a hollow cover 18 which is open at the bottom in order to be installed on ball 10 (see FIG. 2). The hollow interior of cover 11 is sized to fit closely around ball 10 and may be formed of a relatively flexible material such as a plastic which is able to deform so as to tightly retain the cover on ball 10. As best shown in FIG. 3, the thin side walls of cover 18 are bent inwardly and outwardly in an accordion fashion along a plurality of equally spaced vertical bend lines to present inwardly facing corners 19 and outwardly facing corners 20. As shown, the bend lines extend substantially the entire height of the cover walls. Corners 19 bear tightly against the ball 10, while the flexible nature of cover 18 and the bends at the outer corners 20 facilitate the tight fit of the cover over the hitch ball.

A generally cylindrical sleeve 22 is attached to the side of cover 18 by screws 23 or any other suitable means. Alternatively, the sleeve and cover could be integrally moulded in a single piece. Sleeve 22 is provided with a vertical bore in which the lower end of a telescoping sight arm 24 is closely received. Arm 24 is oriented vertically and includes a plurality of telescoping sections which permit extension and retraction of the arm.

The guide device further includes a compressible ball 26 (FIG. 2) which is generally spherical in shape. The ball is preferably constructed of a resilient substance such as rubber which may be compressed and yet tends to urge itself outwardly against the compression. Ball 26 is sized to fit tightly in socket 13 as shown in FIG. 2, with its compressible state, when inserted firmly within the socket, retaining it therein.

An L-shaped bracket 27 is secured to the underside of ball 26 by a screw 28 which extends completely through the guide ball and is secured to bracket 27 by a wing nut 29. Bracket 27 is provided with a plurality of longitudinally spaced holes 30 for receiving screw 28. The distance that the bracket projects horizontally from ball 26 may be adjusted as desired by extending screw 28 through a different one of the holes 30.

A telescoping sight arm 32 is mounted on the outer end of bracket 27. A screw 33 extends upwardly through the bracket and is secured thereto by a nut 34. A coil spring 35 is fit tightly over the top of screw 33 and further receives the lower end of arm 32 therewithin (in spring 35). In actual practice it is usually desirable to locate sight arm 32 as close to socket 13 as possible. In any event, both arms 24 and 32 extend vertically (several feet) and includes a plurality of sections which extend and retract in telescoping fashion.

In use, cover 18 is fit over ball 10 and is firmly retained thereon due to its close fit with the ball and the action of corners 19. Sleeve 22 is located forwardly of ball 10, as shown in FIGS. 1 and 2. The compressible ball 26 is inserted in socket 13, with the compressed condition of the ball firmly retaining it in the socket. Bracket 27 projects forwardly of housing 11 at an adjustable distance, as suggested above. The sight arms 24 and 32 are then extended either fully or partially until they extend upwardly far enough to be readily visible to the driver of the towing vehicle.

To properly position the hitch of the towing vehicle for connection to the hitch of the trailer, the driver backs the vehicle while sighting the extended arms 24 and 32. Since the sight arms are extended to a sufficient height to be readily visible to the driver, they provide guides which permit him to easily back the vehicle to position the two arms adjacent (and in some cases contacting) to one another thereby positioning ball 10 adjacent to housing 11. In this manner, the guide device enables the driver to position ball 10 properly relative to housing 11, both laterally and front to rear. Cover 18 may then be removed from ball 10, and ball 26 may be removed from socket 13. The ball hitch 10 may subsequently be inserted in the adjacent socket 13, and hand wheel 17 may be tightened down to secure the hitch.

For convenient storage between use, arms 24 and 32 are preferably fully retracted in order to facilitate their handling and to minimize the amount of space they occupy. It is pointed out that arms 24 and 32 are easily removed from sleeve 22 and spring 35, respectively, for storage or replacement. Also, ball 26 may be replaced when worn out by removing wing nut 29 and the worn ball 26 from screw 28 and securing another compressible ball on the screw.

From the foregoing, it will be seen that this invention is one well adapted to attain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

Having thus described my invention, I claim:

1. A guide device for assisting in the positioning of a first vehicle having a hitch ball with respect to a second vehicle having a hitch socket, said guide device comprising:

a first sight member for sighting by the vehicle driver;

a ball member coupled with said first sight member to mount same to said hitch socket, said ball member being removably insertable in said socket and fitting tightly therein to mount said first sight member in generally upward extension from said socket to a height visible to the driver;

a second sight member for sighting by the vehicle driver; and a mounting member coupled with said second sight member to mount same to said hitch ball, said mounting member attaching directly to said hitch ball to mount said second sight member in generally upward extension therefrom to a height visible to the driver for positioning in proximity to said first sight member, whereby said ball and socket are positioned in proximity to one another.

2. A guide device as set forth in claim 1 wherein said ball member is constructed of a resiliently compressible material for tight retention in said hitch socket.

3. A guide device as set forth in claim 1 including a bracket interconnecting said ball member and first sight member in spaced relation, said bracket extending generally laterally from said ball member below said socket and having means for adjusting the spacing of said first sight member from said ball member.

4. A guide device as set forth in claim 1, wherein said mounting member includes a hollow flexible cover to which said second sight member is attached in generally upward extension, said cover being sized to closely fit over said hitch ball with the body of said cover in contact with said hitch ball.

5. A guide device as set forth in claim 4, wherein said cover includes side walls presenting a plurality of inwardly projecting corners for engagement with said hitch ball to firmly retain said cover thereon.

6. A guide device as set forth in claim 5, wherein said corners are formed at substantially parallel bend lines spaced apart from one another on said side walls and extending substantially the entire height thereof.

* * * * *